Sept. 29, 1931.  L. C. STUKENBORG  1,825,484
BRAKE TESTING MEANS AND METHOD FOR AUTOMOBILES
Filed Aug. 19, 1929    2 Sheets-Sheet 2
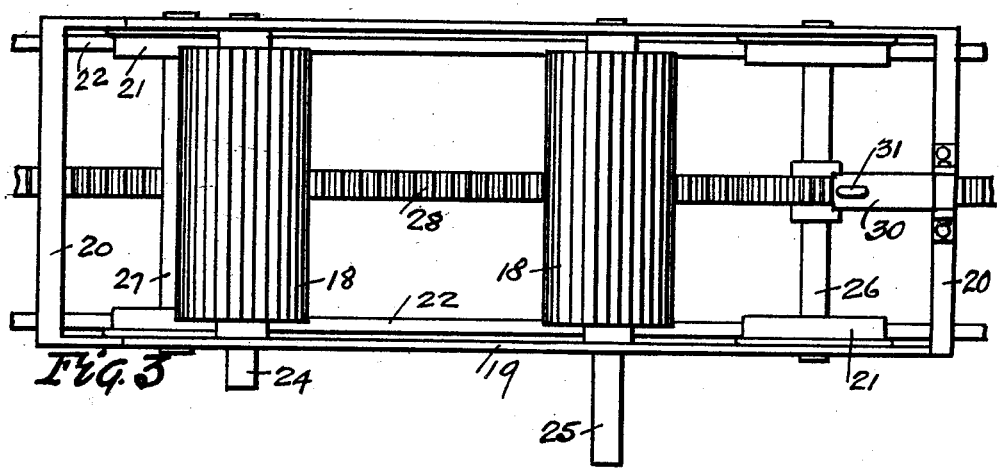
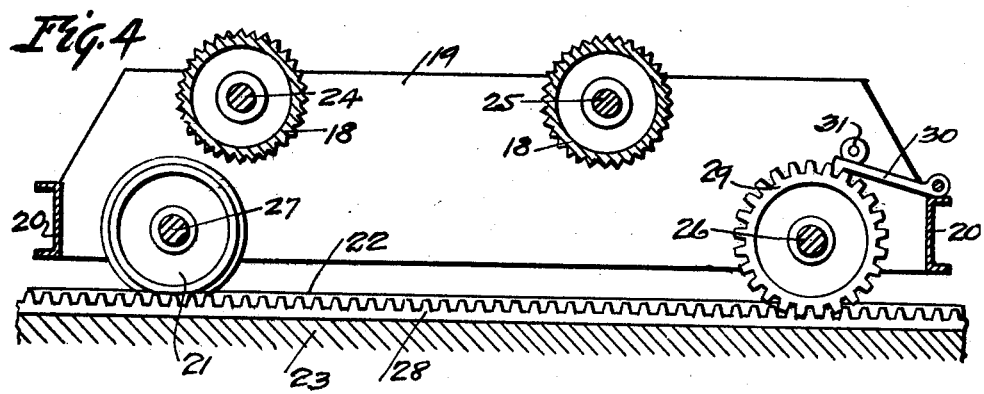
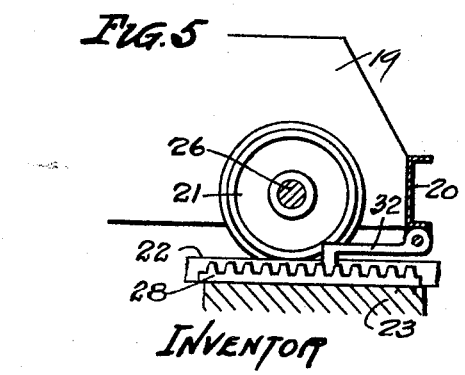
INVENTOR
Louis C. Stukenborg.
by J. H. Weatherford
ATTORNEY.

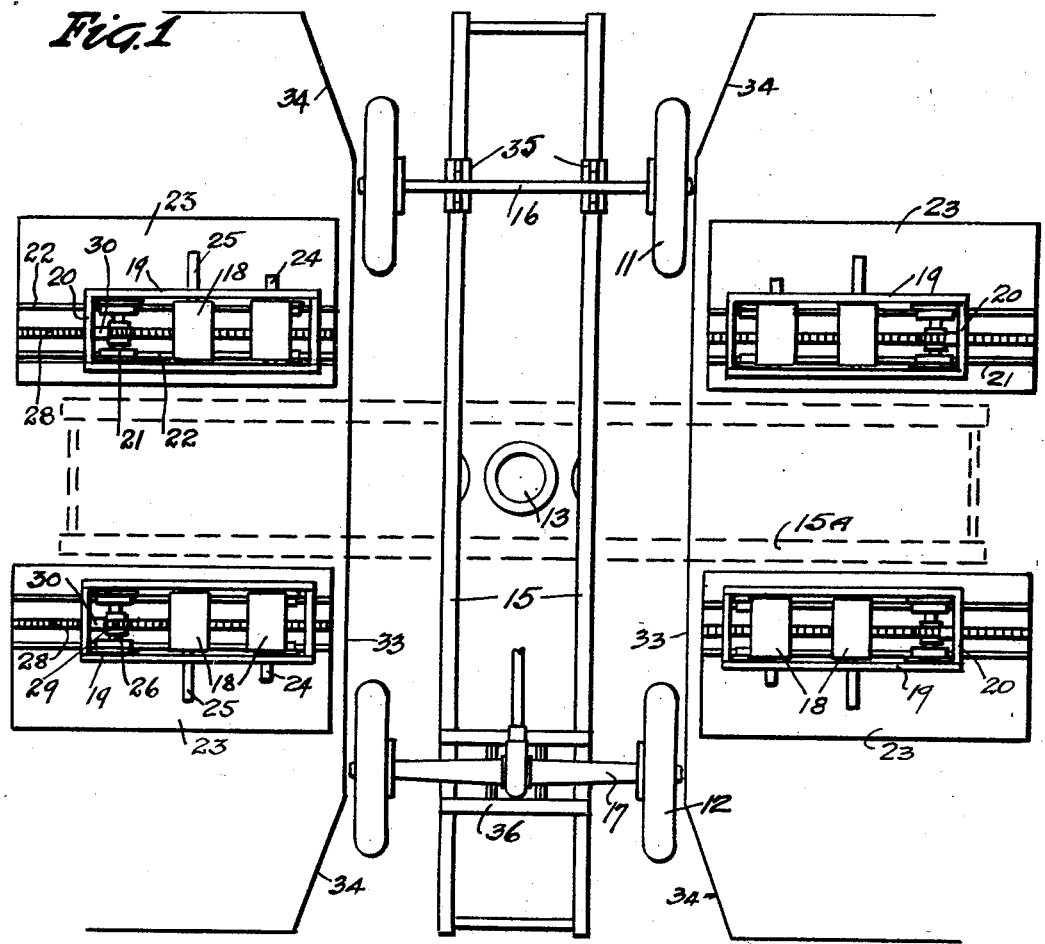
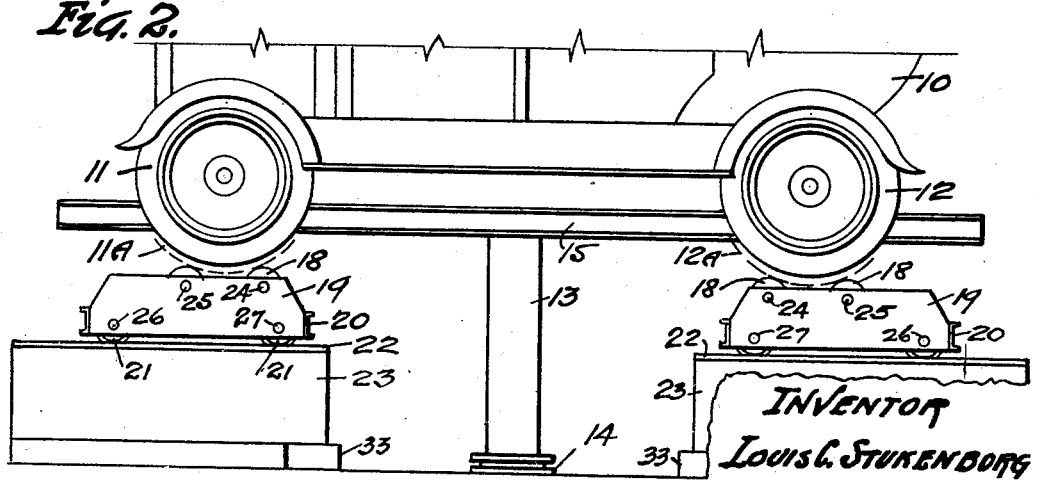

Patented Sept. 29, 1931

1,825,484

UNITED STATES PATENT OFFICE

LOUIS C. STUKENBORG, OF MEMPHIS, TENNESSEE

BRAKE TESTING MEANS AND METHOD FOR AUTOMOBILES

Application filed August 19, 1929. Serial No. 386,842.

This invention relates to improvements in devices for testing the brakes of an automobile, and has especial relation to means and methods by which an automobile may be placed with its wheels on supporting devices on which, or on and by which, the wheels may be rotated while being tested. It further relates to the means by which the supporting devices may be positioned under the wheels of automobiles of varying wheel base and after such positioning may be located in definite place. It will then be understood that this invention relates to the supporting means and the means for locking same in fixed position as distinguished from the testing means proper.

In testing automobile brakes it is necessary to so support the auto that the wheels may be rotated and this is ordinarily done in one of two ways, first by placing a jack under the axle and raising the wheel clear of the ground and second by supporting the wheel on a pair of spaced rollers which are either left free to turn, so that the wheel may be rotated, incidentally turning the rollers, or which rollers are turned by the testing device and the wheels thereby rotated.

Where the axle is supported on a jack and the wheel left free to rotate, the conditions obtained are different from those met with on the road, in that the weight is removed from the bearings and the concentricity of brake band and drum are altered.

The second of these methods is not open to this objection since the rollers support the wheel and car as the road does, it however has heretofore been open to the objection that the wheel must be rolled up an incline and over the first roller and then dropped into the depression between the rollers.

Unless great care is exercised as this drop is made, the wheels bounce and in many cases throw the car off the rollers thereby at times damaging the testing device, or the car, or both, and often involving very considerable trouble in extricating the car. In addition to this, where all four wheels are placed for testing at the same time the forward rollers must be spaced at exactly the correct distance from the rear one to insure proper testing, the drop of all four wheels at the same time greatly accentuates the danger of bouncing off the rollers and if either set of wheels bounce off increases the difficulty of extricating the machine as well as the chance of damaging it. After the tests have been made, difficulty is again encountered in removing the car and often times the drop of the rear wheels on to the rollers previously occupied by the front wheels is even more troublesome and dangerous.

These difficulties are so pronounced that it has been deemed unwise in any event to raise the car above ground level a sufficient amount to allow ready access to the brakes for adjustment and this has so far necessarily been done by digging pits in which the brake adjuster can stand. These pits in themselves are a constant source of danger from the aforementioned causes and are not tolerated by all users of brake testing machines. The dangers and difficulties in either case are so great that few if any owners are permitted to drive their cars on the tester, the work being entrusted almost always to operators familiar with the testers.

In a previous application relating to this same subject matter Serial No. 366,135, filed May 27, 1929, I have described means for supporting an automobile in an elevated position which obviates the troubles incident to the construction of pits. I find however, that a permanently fixed structure or structures, which will serve as elevated bases for the movable roller units possesses certain advantages especially where the roller units are definitely secured in position thereon after they have been positioned under the automobile wheels. The objects of the present invention are:

(a) To provide means for raising an automobile and placing the wheels thereof on supporting rollers which are journalled in roller units positionably mounted on structures permanently elevated above the ground level;

(b) To provide means for guiding the automobile as it approaches these elevated structures; and (c) To provide means for definitely securing the roller carrying units when they have been positioned to receive the automobile wheels.

The means by which the foregoing and other objects are accomplished and the manner of their accomplishment will readily be understood from the following specification on reference to the accompanying drawings, in which:

Fig. 1 is a plan view showing the device with the wheels and axle only of an automobile in position as they would appear at the beginning of the placing cycle and at the completion of the cycle of operation;

Fig. 2 is a side elevation of the lower portion of an automobile after it has been raised and turned to position and after the roller units supported on elevated pedestals have been positioned beneath the wheels ready to receive them;

Fig. 3 is an enlarged plan showing one of the roller units, the supporting track and the locking device in connection therewith;

Fig. 4 is a similarly enlarged sectional elevation taken substantially along the longitudinal center line of Fig. 3; and Fig. 5 is a similar fragmentary section showing a modification of the locking device.

Referring now to the drawings in which the various parts are indicated by numerals, 10 is an automobile, the brakes on the front and rear wheels 11 and 12 respectively, of which, are to be tested. 13 is the plunger of a hydraulic jack, the cylinder 14 of which is sunk in the ground in usual manner and which plunger is rotatable about its vertical axis. 15 is a superstructure carried by the jack plunger and rotatable therewith. This superstructure is adapted to engage the axles 16, 17 of the auto, and other portion of the understructure, with the wheels however free for rotation and lying outside of the superstructure. It will be understood that the hydraulic jack and superstructure are typical only and being well known need not here be shown in detail. It will further be understood that other types of jack or superstructure may be substituted for the ones here indicated so long as they accomplish raising, and permit rotation about the vertical axis of the jack.

18 are rollers in pairs spaced apart and lying parallel to each other which rollers are journalled in supporting side members 19. These side members preferably are connected together by transverse channels 20 to form a frame, and together with the rollers mounted therein will be designated as a roller unit. Each of these roller units is provided with four flanged wheels 21, which wheels will hereinafter be designated as casters to distinguish them from the automobile wheels. These casters rest and roll upon rails 22. The rails 22 are attached to and supported by pedestals 23 which raise them above the ground level and in connection with the roller units provide sufficient elevation to support the automobile at a proper height above the ground level to permit access therebeneath for brake adjustment and such other servicing of the automobile chassis as may be desired.

The roller units 18 may be provided with shafts 24, 25 which extend beyond the side members 19 to provide for the attachment of testing device thereto, should it be desired to utilize a testing device which acts through the rollers. In such case also the rollers are secured to and rotate with their respective shafts. If desired the pedestals 23 may be widened as shown in plan in Fig. 1, to provide a supporting shelf or base for the testing device.

The casters 21 are mounted in pairs on transverse shafts 26, 27 to which shafts they are secured and which shafts are journalled in the side frames 19. Disposed on and secured to the top of each pedestal preferably between the rails 22 is a rack 28. Mounted on and secured to each shaft 26 is a gear which meshes with its respective rack 28. 30 are latches or dogs, which are hingedly mounted, preferably each on one of the transverse channels 20 of the frame units, each of which dogs may be engaged with the teeth of its respective gear to lock the gear against rotation and thereby prevent movement of the roller unit which carries such gear. These dogs may be provided with eyes 31, which may be utilized in engaging or disengaging the dogs from the gears. In Fig. 5, the gear has been dispensed with and a dog 32 is shown engaging directly with the rack 28.

In order to care for automobiles of short wheel base it is necessary that the pedestals 23 be brought as close together as possible and yet allow for the passage of an automobile between them and to obviate danger of striking them I provide curbs 33 which are spaced just far enough apart to permit passage of the wheels. These curbs are provided with flared approaches 34 which ordinarily are duplicated so that the automobile may be guided as it approaches from either direction. Transversely the pedestals are spaced as far apart as possible in order to allow maximum working space therebetween. The pedestals are made of such length that the roller units may be moved apart to care for automobiles of the longest used wheelbase.

In using the device the jack is lowered until the superstructure rests on the surface of the ground and parallel with the curbs 33. The automobile is driven over the jack with the superstructure 15 lying between the wheels and positioned with the axles about equidistant from the jack. When properly positioned, shoes 35 are shifted along the superstructure 15 under the front axle, and a cradle 36 similarly shifted beneath the rear axle. The automobile is then raised by the jack to a position above the level of the rollers 18 and the superstructure is turned about the vertical axis of the jack until the wheels are positioned over the trackways on the pedestals 23. The roller units are then shifted directly beneath the wheels and the jack lowered until the entire weight of the car is supported by the rollers. As soon as the exact positioning of the roller units is determined the dogs 30 are engaged with their respective gears 29, or the dogs 32 directly with the racks 28, to lock the roller units against any possible shifting. The jack is lowered until the entire weight of the automobile is supported by the rollers, after which the brakes may be tested in the usual manner. When rotated the superstructure occupies the dotted position 15A and when lowered to place on the rollers the wheels occupy the dotted positions 11A, 12A respectively.

Since there is no necessity of the wheels lifting themselves out of the depressions between the rollers by their own power the rollers may be spaced as far apart as may be desired provided only that such spacing does not allow the brake parts of the wheels to contact with the roller frames. Such deep placing of the wheels between the rollers effectually prevents the wheels from climbing when the rollers are being driven under test conditions, and to a large extent minimizes the necessity of any other anchorage during the test. After the brakes have been tested the automobile is again raised by the jack turned to clear it from the roller units and lowered until the wheels rest on the ground surface, after which it may be driven away in usual manner.

It will be distinctly understood that the particular means for securing the roller units when positioned is illustrative only and that I do not wish to limit myself to such means except as the detail thereof may be set out in any claim or claims.

Having described my invention, what I claim is:

1. In means for supporting an automobile for brake testing, four elongated pedestals symmetrically disposed and permanently located, said pedestals being longitudinally spaced in pairs to permit the passage of an automobile therebetween, a trackway secured on the top of and extending longitudinally along each pedestal, the pedestals being spaced laterally apart in pairs to conform said trackways to the wheel tread spacing of an automobile, wheel supporting units, disposed one on each of said trackways, each of said units comprising longitudinally disposed frames, parallel transverse rollers spaced apart and journalled in said frames, flanged casters journalled in said frames and conforming in gage to said trackways, said units being positionable along said trackways; and means, rotatable about a vertical axis and adapted to be elevated for raising an automobile, positioned transversely between said pairs of pedestals, above the level of said pedestals and roller units thereon, whereby said automobile may be raised, rotated to position the wheels thereof over said pedestals, said wheel supporting unit may be positioned under said wheels, and said wheels be lowered thereon to support the automobile for brake testing.

2. In means for supporting an automobile for brake testing, four elongated pedestals symmetrically disposed and permanently located, said pedestals being longitudinally spaced in pairs to permit the passage of an automobile therebetween, a trackway secured on the top of and extending longitudinally along each pedestal, the pedestals being spaced laterally apart in pairs to conform said trackways to the tread spacing of an automobile, and extending laterally beyond said trackways, wheel supporting units, disposed one on each of said trackways, each of said units comprising longitudinally disposed frames, parallel transverse rollers spaced apart, shafts secured to and carrying said rollers and journalled in said frames, said shafts extending laterally over said lateral pedestal extensions, to provide means whereby brake testing mechanisms may be secured to said shafts and supported by said pedestals, flanged casters journalled in said frames and conforming in gage to said trackways, said units being positionable along said trackways; and means, rotatable about a vertical axis and adapted to be elevated for raising an automobile, positioned transversely between said pairs of pedestals, above the level of said pedestals and roller units thereon, whereby said automobile may be raised, rotated to position the wheels thereof over said pedestals, said wheel supporting unit may be positioned under said wheels, and said wheels be lowered thereon to support the automobile for brake testing.

3. In means for supporting an automobile for brake testing, four elongated pedestals symmetrically disposed and permanently located, said pedestals being longitudinally spaced in pairs to permit the passage of an automobile therebetween, a trackway secured on the top of and extending longitudinally along each pedestal, the pedestals being spaced laterally apart in pairs to conform said trackways to the tread and spacing of an automobile, and curbs for directing and positioning an automobile between said pedestals, wheel supporting units, disposed one on each of said trackways, each of said units comprising longitudinally disposed frames, parallel transverse rollers spaced apart and journalled in said frames, flanged casters journalled in said frames and conforming in gage to said trackways, said units being positionable along said trackways; and means, rotatable about a vertical axis and adapted to be elevated for raising an automobile, positioned transversely between said pairs of pedestals, above the level of said pedestals and roller units thereon, whereby said automobile may be raised, rotated to position the wheels thereof over said pedestals, said wheel supporting unit may be positioned under said wheels, and said wheels be lowered thereon to support the automobile for brake testing.

4. In means for supporting an auto for brake testing; units, each comprising a frame, parallel rollers spaced apart journalled in said frame, shafts journalled in said frame, and casters mounted on and secured to said shafts, a gear secured on one of said shafts, a latch engageable with said gear to lock same against rotation, and means hinged securing said latch to said frame; trackways each supporting the casters of a unit, and racks each disposed parallel with one of said tracks, each meshing with one of said gears, whereby each of said units may be positioned along its trackway and secured in position by latching its gear.

5. In means for supporting an automobile for brake testing, four elongated pedestals symmetrically disposed and permanently located, laterally spaced in pairs to conform to the wheel tread spacing of an automobile and longitudinally spaced in pairs to permit the passage of an automobile therebetween; wheel supporting units adjustably disposed one on each of said pedestals, said units being positionable longitudinally, along said pedestals; and means, rotatable about a vertical axis and adapted to be elevated for raising an automobile, positioned transversely between said pairs of pedestals, above the level of said pedestals and wheel supporting units thereon; whereby said automobile may be raised, rotated to position the wheels thereof over said pedestals, said wheel supporting unit may be positioned under said wheels, and said wheels be lowered thereon to support the automobile for brake testing.

6. In means for supporting an automobile for brake testing, four elongated pedestals symmetrically disposed and permanently located, laterally spaced in pairs to conform to the wheel tread spacing of an automobile and longitudinally spaced in pairs to permit the passage of an automobile therebetween; wheel supporting units adjustably disposed one on each of said pedestals, at least one pair of said units being positionable longitudinally, along said pedestals; and means, rotatable about a vertical axis and adapted to be elevated for raising an automobile, positioned transversely between said pairs of pedestals, above the level of said pedestals and wheel supporting units thereon, whereby said automobile may be raised, rotated to position the wheels thereof over said pedestals, said wheel supporting unit may be positioned under said wheels, and said wheels be lowered thereon to support the automobile for brake testing.

7. In means for supporting an automobile for brake testing, four elongated pedestals symmetrically disposed and permanently located, laterally spaced in pairs to conform to the wheel tread spacing of an automobile and longitudinally spaced in pairs to permit the passage of an automobile therebeween; a pair of wheel supporting units adjustably disposed on a pair of said pedestals, said units being positionable longitudinally, along said pedestals; and means, rotatable about a vertical axis and adapted to be elevated for raising an automobile, positioned transversely between said pairs of pedestals, above the level of said pedestals and wheel supporting units thereon, whereby said automobile may be raised, rotated to position the wheels thereof over said pedestals, said wheel supporting unit may be positioned under said wheels, and said wheels be lowered thereon to support the automobile for brake testing.

8. In means for supporting an automobile for brake testing, four elongated pedestals symmetrically disposed and permanently located, laterally spaced in pairs to conform to the wheel tread spacing of an automobile and longitudinally spaced in pairs to permit the passage of an automobile therebetween; and curbs for directing and positioning an automobile between said pedestals; wheel supporting units adjustably disposed one on each of said pedestals, said units being positionable longitudinally, along said pedestals; and means, rotatable about a vertical axis and adapted to be elevated for raising an automobile, positioned transversely between said pairs of pedestals, above the level of said pedestals and wheel supporting units thereon, whereby said automobile may be raised, rotated to position the wheels thereof over said pedestals, said wheel supporting unit may be positioned under said wheels, and said wheels be lowered thereon to support the automobile for brake testing.

In testimony whereof I hereunto affix my signature.

LOUIS C. STUKENBORG.